(12) United States Patent
Glaeser et al.

(10) Patent No.: US 8,233,407 B2
(45) Date of Patent: Jul. 31, 2012

(54) METHOD FOR PROVIDING A TABLE OF STATION-SPECIFIC INFORMATION IN A NETWORK OF DISTRIBUTED STATIONS, AND NETWORK STATION FOR CARRYING OUT THE METHOD

(75) Inventors: Frank Glaeser, Hannover (DE); Ralf Koehler, Hannover (DE); Jens Brocke, Laatzen (DE); Kurt Knuth, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1082 days.

(21) Appl. No.: 11/630,022

(22) PCT Filed: Jun. 16, 2005

(86) PCT No.: PCT/EP2005/052780
§ 371 (c)(1),
(2), (4) Date: Dec. 18, 2006

(87) PCT Pub. No.: WO2006/003085
PCT Pub. Date: Jan. 12, 2006

(65) Prior Publication Data
US 2011/0099178 A1    Apr. 28, 2011

(30) Foreign Application Priority Data
Jun. 30, 2004  (DE) .......................... 10 2004 031 945

(51) Int. Cl.
*H04L 12/28* (2006.01)
*G06F 3/00* (2006.01)
(52) U.S. Cl. .......................................... 370/257; 710/8

(58) Field of Classification Search .................. None
See application file for complete search history.

(56) References Cited

U.S. PATENT DOCUMENTS 5,815,678 A * 9/1998 Hoffman et al. .............. 710/305
(Continued)

FOREIGN PATENT DOCUMENTS
EP           0868048           9/1998
(Continued)

OTHER PUBLICATIONS
Search Report Dated Aug. 8, 2005.
(Continued)

*Primary Examiner* — Hassan Phillips
*Assistant Examiner* — Hicham Foud
(74) *Attorney, Agent, or Firm* — Tutunjian & Bitetto, P.C.

(57) ABSTRACT

After every bus reset operation in an IEEE 1394 network, the network is reconfigured. This involves a table with further station-specific information being created after the bus initialization phase, the tree structure identification phase and the self identification phase. Each network station returns its station-specific information to the requesting network station. In the first phase, all that information which has been received up to a time determined by a first abort criterion is sorted into the table. Next, the still incomplete table is enabled for use by an application program in the requesting network station. In the second phase, the still missing station-specific information is then requested again and is sorted into the table when it is delivered by the stations to which requests have been sent. After a time determined by a second abort criterion, the further request for the still missing station-specific information is terminated and the table is closed in this state and is provided for use by the application software.

12 Claims, 4 Drawing Sheets

U.S. PATENT DOCUMENTS

| | | | |
|---|---|---|---|
| 6,038,625 A * | 3/2000 | Ogino et al. | 710/104 |
| 6,160,796 A * | 12/2000 | Zou | 370/257 |
| 6,336,152 B1 | 1/2002 | Richman et al. | |
| 6,477,589 B1 | 11/2002 | Suzuki et al. | |
| 7,636,742 B1 * | 12/2009 | Olavarrieta et al. | 1/1 |
| 2002/0032855 A1 | 3/2002 | Neves et al. | |
| 2002/0093977 A1 | 7/2002 | Ono | |

FOREIGN PATENT DOCUMENTS

| | | |
|---|---|---|
| JP | 2002152210 | 5/2002 |
| JP | 2002217908 | 8/2002 |
| JP | 2003283502 | 10/2003 |

OTHER PUBLICATIONS

Teener et al., "IEEE 1394-1995, High Performance Serial Bus", Zyante Inc., 1998, pp. 1-53.

IEEE-1394, Firewire, i.Link, http://graphics.cs.uni-sb.de/Courses/ws9900/cg-seminar/Ausarbeitung/Johanna Voelker/fire.htm, Inabes, "Bus-Management".

Teener et al., "New Technology for 1394: P1394a and P1394b", Zyante Inc., 1998, pp. 1-31.

"IEEE 1394", Wikipedia, http://en.wikipedia.org/wiki/Firewire.

* cited by examiner

METHOD FOR PROVIDING A TABLE OF STATION-SPECIFIC INFORMATION IN A NETWORK OF DISTRIBUTED STATIONS, AND NETWORK STATION FOR CARRYING OUT THE METHOD

This application claims the benefit, under 35 U.S.C. §365 of International Application PCT/EP05/052780, filed Jun. 16, 2005, which was published in accordance with PCT Article 21(2) on Jan. 12, 2006 in English and which claims the benefit of German patent application No. 102004031945.6, filed Jun. 30, 2004.

The invention relates to a method for providing a table of station-specific information in a network of distributed stations and to a network station for carrying out the method. In particular, the invention relates to the aforementioned method and to the aforementioned network station in connection with the IEEE 1394 data bus standard.

BACKGROUND TO THE INVENTION

Home networks are known for networking appliances in the household sector. The interconnected appliances may emanate from the field of consumer electronics, such as television set, video recorder, DVD player, satellite receiver, CD player, MD player, amplifier, camcorder etc. In this context, mention is also made of a personal computer, which may likewise be regarded as a consumer electronics appliance today.

To network appliances from the field of consumer electronics, industry has developed appropriate communication systems. The primary intention here is wire-based networking of appliances, and in this case particularly using the "IEEE 1394 bus system", which allows data to be interchanged at a very high data rate between the individual network stations. The IEEE 1394 interfaces, which have been widely used to date, generally support the specified data transmission speeds S 100, S 200, S 400. In this case S 100 means a data transmission rate of approximately 100 Mbit/s. S 200 accordingly means approximately 200 Mbit/s and S 400 means Mbit/s. Such high data rates are required, in particular, for interchanging data between consumer electronics appliances. The reason for this is that a typical application involves playback of a track from a video/audio source, either a video film or a piece of music, and the associated data stream being transmitted to another consumer electronics appliance or a plurality of consumer electronics appliances as data sink(s). For this instance of application, a data link is set up between the appliances in question which interchange data with one another. This data link is then used to transmit data packets on a regular basis. This form of data transmission is called isochronous data transmission in the IEEE 1394 standard, this involving data packets being transmitted from the data source to the data sink or data sinks on a regular basis, at particular intervals of time.

In addition, the IEEE 1394 bus is also used for asynchronous data transmission. In this case, data packets are transmitted more or less as required. The number of such data packets sent via the bus is dependent on the data volume which arises. Asynchronous data transmission is predominantly used for identifying and controlling an appliance in the network from another appliance which is in the network. The IEEE 1394 standard has only a few restrictions in respect of the topology of the IEEE 1394 network. The permitted bus topology corresponds to a tree structure. Depending on the instance of application, the tree structure may take different forms, however, and in this regard the network can be made very variable.

In the case of the IEEE 1394 bus, a respective reset operation (bus reset) is executed on the data bus when an electronic appliance is connected to the bus lines or is disconnected from the bus lines. Following a bus reset operation, the network needs to be reconfigured each time. In the case of the IEEE 1394 standard, this is done in three phases. In the first phase, the bus is initialized (Bus Initialize). In this phase, the connection status is detected for each of the interfaces inputs/outputs (ports).

In the second phase, the tree structure of the network is ascertained (Tree Identify). In this phase, a network station is determined as base node (root).

The third phase concerns the phase of self identification for all network stations (Self Identify). In this phase, the previously determined base node asks each further network node to transmit the "self ID information". The self ID information is evaluated by each network node that is on the bus. This ensures that each network station is informed about what other network stations are connected in the network. The self ID information is used by each network station to identify itself to the other network stations in the network. Using the self ID information received from the other respective network stations, each network station is able to create a "network node list" and to store it in a respective memory device associated with the network station. This stored information can then be processed by a driver program in the respective network station during bus management.

The three cited phases after a bus reset operation take place with hardware support by the network interface in each station. In these phases, there are therefore hardly any significant delays. The length of the respective phase is deterministic and essentially dependent on how many network stations there are in the network.

Nevertheless, the bus configuration is not yet complete after passing through the three phases presented. There is normally also a fourth phase, in which further configuration data are interchanged between the network stations. This is because an IEEE 1394 interface also contains a "configuration ROM" containing important information about the properties and the identity of the respective network station. Three entries in this ROM are important for globally identifying the network station. These are node_vendor_ID, chip_ID_hi and chip_ID_lo. These three code numbers together form a 64-bit identification number GUID (Global Unique Identifier) which can be used to address the network station uniquely in a network. In the fourth phase after the bus reset operation, this important information is therefore interchanged among the network stations in the network. This is done by virtue of each network station requesting the contents of these configuration memories from the other network stations. The information obtained is gathered in the network station and a "network node information table" is created therefrom. Using the information in this table, the driver software can then address other network stations directly during later network operation.

Invention

The configuration ROM entries are no longer requested exclusively with hardware support in the respective interface chips, however. In particular, a network station to which a request has been sent will not automatically return a hardware-triggered response containing the information that has been read instantaneously. In this case, reading is software controlled. Time delays may therefore arise in this case. A problem which has become apparent to the inventors is that it can sometimes take a very long time before the entries in the configuration ROM of all network stations on the bus have been read. In some network stations, there were very significant delays before they had returned the desired information. However, it is now the case that many applications which use an IEEE 1394 driver perform their transactions with global addressing. That is to say that these programs perform the addressing on the basis of the global 64-bit address which is in the respective configuration ROM. These application programs are dependent on the entries in the network node information table. However, the application cannot access this table until it has received the information from the bus management entity for the network station that the table has been enabled for use and thus contains the required information for all stations in the network.

If the network now contains a network station which reacts very slowly to the request to return the configuration data, the application itself cannot implement any GUID-addressed information, which means a disruptive enforced pause for the application. Depending on the type of application, it may also be subject to protocol-dependent time demands which it therefore cannot meet at this time.

It is the aim of the invention to prevent the unwanted delay response when setting up the network node information table.

The invention solves the problem by virtue of the network node information table being created in two phases. In the first phase, the entries begin to be read into the configuration ROMs of all network stations on the bus. The first phase ends after the data from all network stations with an appropriately short reaction time are available. A particular time limit is thus defined for the end of the first phase. The still incomplete network node information table is enabled for use by the application after the end of the first phase. In the second phase, attempts continue to be made to read the entries in the configuration ROMs of all network stations that are still missing. A time limit is likewise defined for the second phase. The information obtained during the second phase is used to complete the network node information table. If the information from network stations is still missing even after the second phase has elapsed, no further requests are sent to these missing network stations and the table is closed in its current state, so that the network stations which are still missing are then declared as not available therein.

The invention has the advantage that the application can start its own transactions as soon as the first phase has ended. This avoids a very slow and disruptive reaction from the application after a bus reset operation. The table is in that case not yet closed, however, and continues to be completed in the second phase.

The measures cited in the subclaims permit advantageous developments and improvements. One advantage is that the application software is informed in the second phase about each addendum of additional information to the network node information table, so that information from and to the newly entered network node can actually be implemented during the second phase.

It is advantageous if a request for the station-specific information is provided with an upper time limit for the response from the outset and if the request is repeated if this upper limit is exceeded. In this case, an upper time limit may advantageously be stipulated simply by a number of repetitions for the request for station-specific information.

In an IEEE 1394 network, it is advantageous if the upper time limit for the response to the request for the station-specific information is set to a defined value, e.g. 100 ms, and the upper limit for the number of repetitions for defining the abort criterion for the end of phase 1 corresponds to a number between 3 and 6.

This takes account of the special feature that if the application is the "HAVi stack" (Home Audio Video interoperability) there is only one second available for again setting up a data link which already existed before a bus reset operation. The application therefore needs to be able to access the network node information table within less than one second in order to be able to set the appropriate entries in "plug registers" for setting up the link again.

For a network station for carrying out the inventive method, the appropriate advantageous measures are indicated in claims 7 to 12.

DRAWINGS

The invention is explained in more detail below using exemplary embodiments with reference to drawings, in which.

EXEMPLARY EMBODIMENTS OF THE INVENTION

Figure 1:
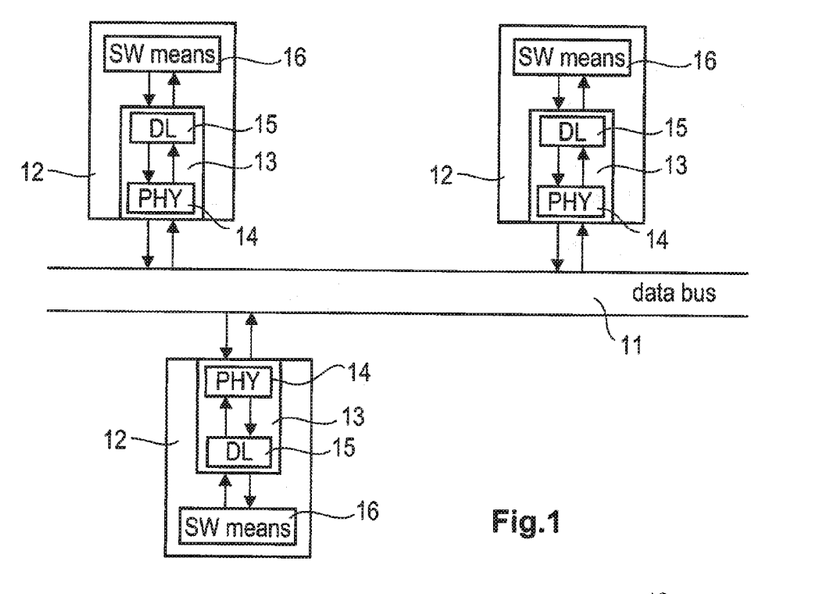
FIG. 1 shows the basic structure of a home network.

FIG. 1 shows a schematic illustration of a home network in which a plurality of electronic appliances 12 are connected to a data bus 11 via a respective bus interface 13 for sending/receiving data packets via the data bus 11. The data bus 11 may be in the form of an IEEE 1394 data bus. Accordingly, the bus interfaces 13 are then likewise each in the form of an IEEE 1394 interface. In the case of an IEEE 1394 interface 13, the two components physical layer and data link layer based on the OSI/ISO layer model for data communication are in the form of separate hardware chips. In this case, the reference numeral 14 denotes a physical layer IC and the reference numeral 15 denotes a data link layer IC. Alternatively, the two chips may be integrated in a single chip. Besides the bus interface 13, "software means" 16 are shown as a further component in the electronic appliances 12. The software means 16 comprise both an application program for the respective electronic appliance 12, if appropriate, and also a driver program for operating the bus interface 13, if appropriate, in order to provide the functionalities of the bus interface 13. The exact structure of the software means 16 is explained in more detail below. The application software installed in the electronic appliance 12 uses the bus interface 13 in order to send or receive data packets via the data bus 11.

Figure 2:
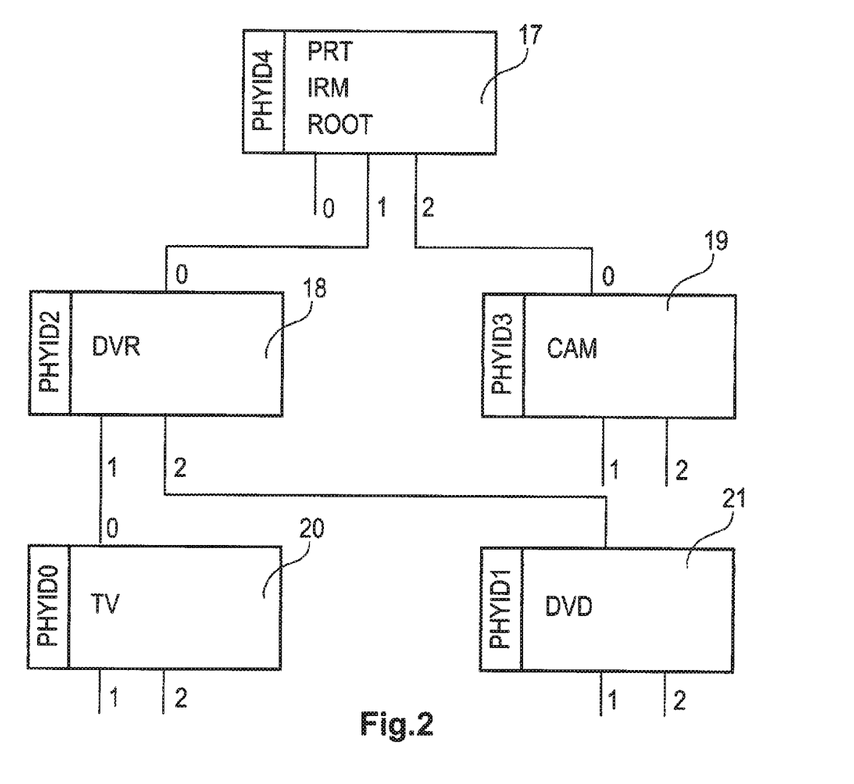
FIG. 2 shows the actual tree structure of an exemplary IEEE 1394 network.

FIG. 2 shows an example of an IEEE 1394 network. The individual appliances are connected to one another as in a tree structure. In this case, the appliance with the reference numeral 17 is a printer. The reference numeral 18 denotes a digital video recorder. By way of example, this may be a digital satellite receiver with an integrated hard-disk recorder. The reference numeral denotes a video camera in the form of a digital camcorder, for example DV camcorder. The reference numeral 20 denotes a digital TV set. The reference numeral 21 denotes a DVD player. As shown, all electronic appliances which are in the network are equipped with a "3-Port-IEEE 1394 interface". In the case of the appliances 19, 20 and 21, only port 0 is in use in each case, in the case of the printer 17, ports 1 and 2 are in use, and in the case of the digital video recorder 18, all three ports are in use.

After each bus reset operation in the IEEE 1394 bus system, the network is reconfigured. The bus system is designed such that appliances can be connected to or disconnected from the network in the course of operation. This feature of the IEEE 1394 bus system is also known by the term Live Insertion feature in specialist circles. To implement this property, a bus reset operation is triggered whenever an appliance has been connected or disconnected in the network. Following this bus reset operation, the network is reconfigured. This operation takes place in four phases. The first phase is called bus initialization (Bus Initialize). In this phase, each network node ascertains whether it corresponds to a branch or a leaf in the tree structure. This is recognized from whether a plurality of the ports have bus cables connected to them or whether only a single port is in use. In the phase which follows that, the actual tree structure is identified (Tree Identify). In this phase, a base node (root) is determined for the network. In the example network shown in FIG. 2, it is the printer (17) which has been determined as base node. The subsequent phase relates to the phase of self identification (Self Identify). In this phase, each electronic appliance identifies itself in the network using a "physical identification number" (PHY ID). From this, the previously ascertained base node determines the order in which the electronic appliances transmit their identification information to all other network nodes. In FIG. 2, the physical identification number PhyID is respectively indicated for each electronic appliance.

The precise details for the bus initialization phase, the tree structure identification phase and the self identification phase are known from the IEEE 1394 standard. In this regard, reference is therefore made expressly to the standard IEEE 1394 1995, "Standard for High Performance Serial Bus", from the year 1995. Extensions to this standard have likewise been adopted and published. These include the version IEEE 1394a and version IEEE 1394b.

Each network node uses the information, obtained in the self identification phase, about every other electronic appliance which is in the network to set up a node list containing the physical identification numbers of the respective appliances. The information transmitted during the self identification phase likewise contains a statement about the respective data transmission rate supported. This information is used by each interface node to set up a "data transmission speed table" (speed map) which is to be observed for future data transmissions.

This does not yet fully conclude reconfiguration of the IEEE 1394 network, however, since full reconfiguration also requires particular bus management entities still to be determined for the network. As a fourth phase, a phase of self configuration follows. This phase will be explained in more detail below. Before that, however, the "protocol architecture" of an IEEE 1394 interface will be explained in more detail.

Figure 3:
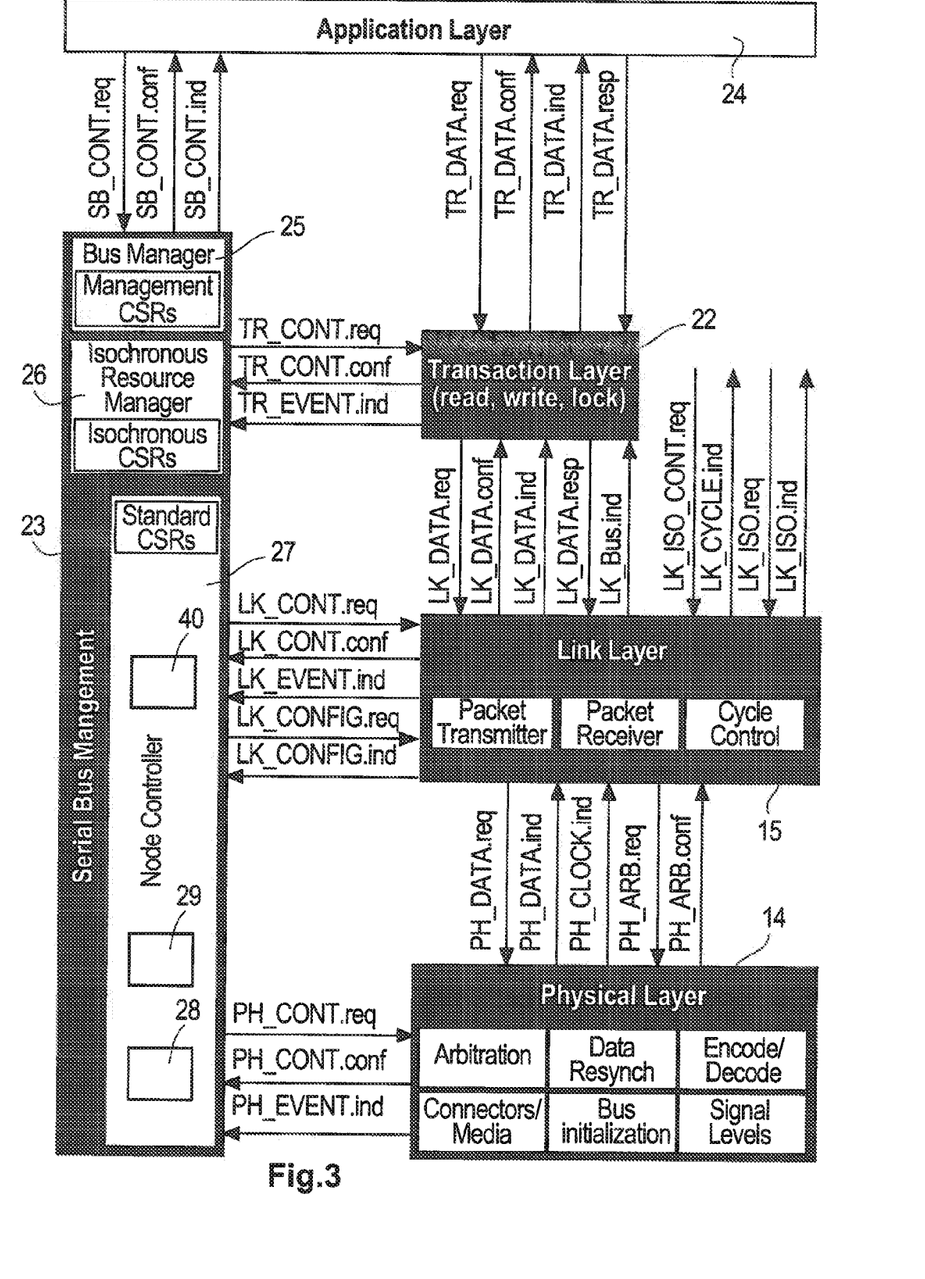
FIG. 3 shows the "protocol architecture" for a network station based on the IEEE 1394 1995 standard.

The protocol architecture is shown in FIG. 3. The two communication layers physical layer 14 and data link layer 15 are implemented by separate circuit units or by a single integrated circuit unit, that is to say using hardware. The other layers shown, namely "Transaction Layer" 22, "Serial Bus Management" 23 and "Application Layer" 24, are normally implemented by means of software, which is then executed on a powerful microcontroller in the network station. The individual components for the physical layer 14, the data link layer 15 and the transaction layer 22 are described in detail in the IEEE 1394 standard and are therefore not explained in more detail at this juncture.

Within the layer for the "Serial Bus Management" 23, the components "Node Controller" 27, "Isochronous Resource Manager" 26 and "Bus Manager" 25 are highlighted. In an IEEE 1394 network, no more than one bus manager 25 and no more than one isochronous resource manager 26 are active at a time, even if a plurality of network nodes can execute the respective function. Both functions are optional in line with the IEEE 1394 standard, however. Which network node executes the respective function is redetermined after each bus reset operation. If the base node is able to execute the respective function, the methods provided in the IEEE 1394 standard mean that it is highly probable that the respective function of the base node is activated. In the aforementioned self configuration phase, which follows the self identification phase, the node controller 27 of a network station sends individual requests to all further network stations, which contain the request to return important entries in the configuration memory of the respective bus interface. Each interface has such a protected memory area, called configuration ROM, associated with it. The content of the configuration ROM is defined in the IEEE 1394 standard. This configuration ROM contains at least one "bus_info_block". The content of this block is read in the self configuration phase and is returned to the requesting network station as a data packet.

Figure 4:
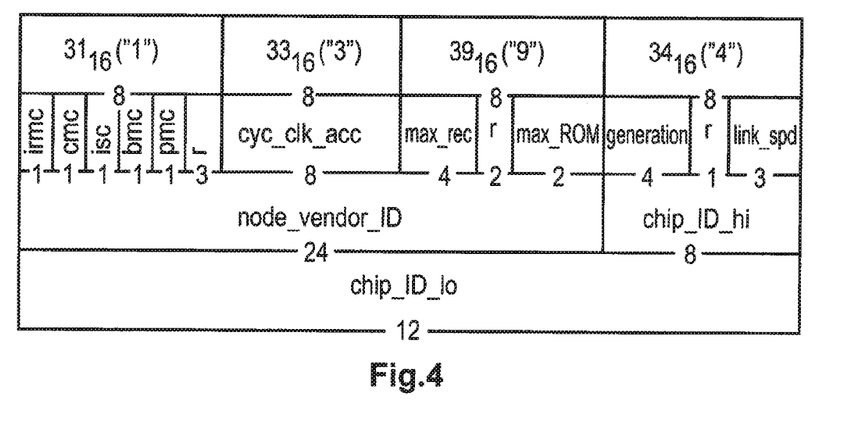
FIG. 4 shows the format of the "bus_info_blocks" within the configuration ROM of an IEEE 1394 network station.

FIG. 4 shows the format of the bus_info_block. The bus_info_block comprises four quadlets, that is to say four times 32-bit memory words. As FIG. 4 shows, the first quadlet contains the entry "1394" in line with ASCII code, the individual ASCII characters being entered in the memory in hexadecimal notation. The second quadlet of the bus_info_block contains entries for important properties of the respective network station. The entry irmc indicates whether the network station has the capability to operate as an isochronous resource manager. The entry cmc indicates whether the network station has the property of operating as a cycle master. The entry isc signals whether the network station supports isochronous data traffic. The entry bmc indicates whether the network station has the property of operating as a bus manager. The entry cyc_clk_acc relates to the accuracy of the clock signals produced by this network station when it is operating as a cycle master. The entry max_rec indicates the maximum permissible size of the useful data in asynchronous data traffic. Further entries which are very important to the invention are held in the third and fourth quadlets of the bus info block. To explain, the entries node_vendor_ID, chip_ID_hi and chip_ID_lo together form the global 64-bit address mentioned at the outset, which can be used to address the network station uniquely.

It is an aim to use the configuration phase to create a network node information table which records the important 64-bit address together with the associated physical identification number.

As mentioned, each network station is asked individually by a requesting means (40) in a requesting node controller in a network station to transmit the bus_info_block. Unfortunately, an instantaneous reaction from the interface node to which the request has been sent in the IEEE 1394 network is not guaranteed. This return of the desired reaction is not implemented by special hardware at physical-layer or data-link-layer level, but rather takes place at the level of the transaction layer 22, that is to say normally under the control of software. The case may now arise that the desired information is available only after a relatively long delay. This is because experiments with such home networks have revealed network stations which, following a bus reset operation, are busy for a relatively long time with other operations and thus return the desired bus_info_block only after a very long time delay or in some cases even not at all. In this case, the problem exists that the setup of the network node information table is delayed to a very great extent when the 64-bit addresses are compiled. Since the table is not enabled for use by the application until after it has been fully created, this means that the application software is not able to perform any transactions based on these 64-bit addresses for this long period.

In the case of the extended communication system based on the HAVi standard (Home Audio Video interoperability), which was developed in the field of home networks particularly for data interchange between consumer electronics appliances, all transactions take place with GUID addressing. The "HAVI software stack" could thus perform no transactions at all in such a case, which must result in significantly slower reactions when executing the application software and is therefore also likely to have a very irritating effect for the user of the appliance.

To avoid this unwanted behavior in a home network appliance, the network node information table based on the invention is set up in two phases. This is illustrated in FIG. 5.

Figure 5:
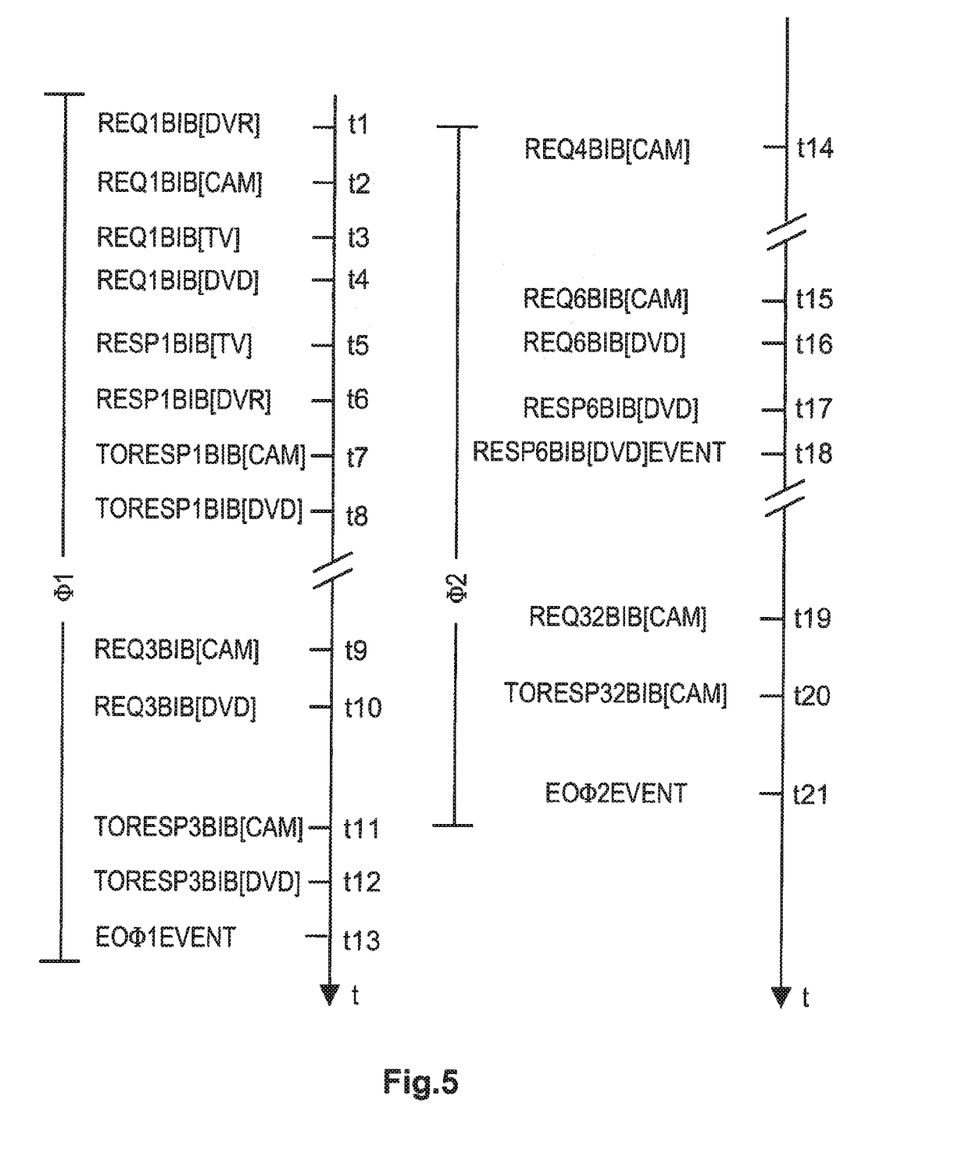
FIG. 5 shows the time sequence when creating a network node information table based on the invention.

FIG. 5 shows, for the example network shown in FIG. 2, the time sequence within phase 1, on the left-hand side, and the time sequence within phase 2, on the right-hand side. Phase 2 follows phase 1 without interruption. At the start of phase 1, the node controller for the printer 17 sends read requests to the other network stations—digital video recorder 18, camcorder 19, TV set 20 and DVD player 21. The read requests are sent individually in combination at the times t1-t4, i.e. the response from one station is not first awaited before the next read request is sent. At the time t5, the response from the TV set is received. At the time t6, the response comes from the digital video recorder 18. All read requests are automatically provided with a "timeout time". This is the content of the specified transaction layer in the IEEE 1394 network. The timeout time for such read transactions is respectively stipulated for a network station in a CSR register. Normally, the shortest possible value of 100 ms is stored therein. At the time t7, the timeout time for the response from the camcorder is exceeded. At the time t8, the timeout time for the response from the DVD player 21 is also exceeded. Further read requests are then sent to these two appliances (not shown). At the time t9, the camcorder 19 is asked for the third time to read and return its bus_info block. At the time t10, the third read request is also sent to the DVD player 21. At the time t11, the timeout time of 100 ms for the camcorder 19 is again exceeded. At the time t12, it is likewise exceeded for the return of the response from the DVD player 21. On account of the fact that the two stations which are still missing—camcorder 19 and DVD player 21—were not able to deliver their entries from the configuration ROM even after the third request, table generation means 29 in node controller 27 terminate phase 1 at the time t13. At this time, the still incomplete network node information table is enabled with an EO.PHI.1 Event. This event is also used to notify the application of how many network stations have not yet transmitted their configuration data. After that, the application has the information regarding for which network stations the configuration ROM entries are available, and when a transaction thus needs to be performed for one of these stations this can be done as soon as phase 1 has ended. For those network stations for which the table still contains no information, the application software cannot perform a transaction even after the end of phase 1.

The end of phase 1 is followed immediately by the start of phase 2. At the time t14, a further read request is sent to the camcorder 19. A read request is likewise sent to the DVD player, not shown.

After several further attempts, the sixth read request is sent to the camcorder 19 at the time t15. At the time t16, the sixth read request is sent to the DVD player 21. Finally, the DVD player 21 is able to return the desired information at the time t17. The additional information is transferred to the network node information table 28. At the time t18, the application is notified of the receipt of new information for the network node information table 28. This is done using an event indicating the physical identification number (PHY ID). The application thus also has the information that a further appliance has been entered in the network node information table and it is thus also possible to perform transactions for this appliance. After several further attempts to read the bus_info_block from the camcorder 19 and corresponding timeout events for these reading attempts, a read request is sent to the camcorder 19 for the 32nd time at the time t19. Since this 32nd read request is ultimately also resolved with a timeout, the abort criterion for phase 2 is reached. Phase 2 for setting up the table is therefore ended at the time t21. At this time, the network node information table, such as it is, is closed and is made available to the application. The application is notified of this using a further event. The application can then respond to desired transactions for the network station which is still missing with an error message.

Figure 6:
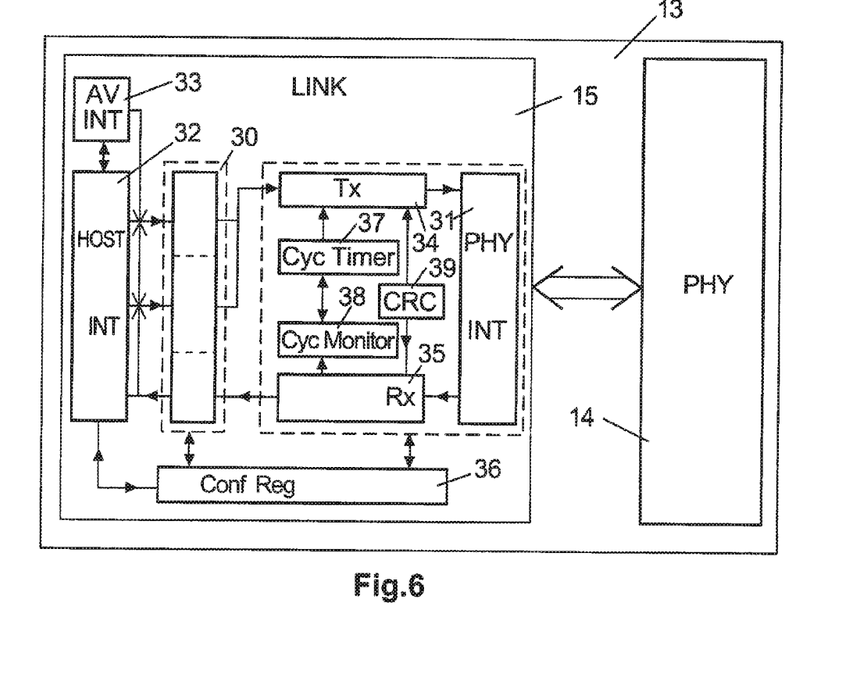
FIG. 6 shows a detailed block diagram of an IEEE 1394 interface.

FIG. 6 shows a block diagram of a network interface 13. This contains the two aforementioned ICs—the physical layer IC 14 (Phy-IC for short) and the data link layer IC 15 (Link-IC for short). In respect of the described invention, only the part of the Link-IC 15 will be discussed in more detail. For the Phy-IC 14, a commercially available Phy-IC can be used. The structure of the Link-IC 15 shown is similar to the structure of the Link-IC called TSB-Layer 12LV01A from Texas Instruments. For the disclosure of this structure, reference is therefore also made expressly to the description of this IC in the datasheet.

The Link-IC 15 contains an interface 31 for the physical layer (Physical Layer Interface). The IC likewise contains an interface 32 for an external application processor. In addition, the IC contains a further interface, called AV interface 33, via which the audio and video data from an application process are sent to the IC. The internal memory is denoted by the reference numeral 30. This memory is divided into three sections. Each section is in the form of an FIFO. Two of the sections are provided as memory for the data transmission, while just one area is provided for receiving data packets. Accordingly, a transmission unit 34 and a reception unit 35 are also provided in the Link-IC 15. As a separate unit, a cycle counter 37 is also shown, whose counter reading, in each case under the control of a monitor circuit 38, is used to generate the timestamps for transmitting the data source packet. In addition, there is also a checking unit 39 which, by way of example, evaluates the CRC code when a bus packet is received or else calculates the associated CRC code when a bus packet is to be transmitted. The IC also contains configuration and status registers 36, which allow the IC to be controlled without a dedicated processor. The information for transmitting the self ID information packet may be contained in integrated form in the interface 31 for the physical layer. The protected memory area—configuration ROM—may be integrated in the area containing the configuration and status registers 36. Alternatively, a read/write memory (RAM) may also be provided in addition, said memory containing a copy of the corresponding configuration ROM entries. This read/ write memory area may also alternatively be located externally to the Link IC 15, and would then be held in the general RAM area associated with the network station.

At the outset, there was a description of the fact that the application software in the network station may be subject to pressure to perform particular GUID-addressed transactions within a predetermined time. For this, the example of isochronous data transmission based on the IEEE 1394 network standard is explained. The case of audio/video transmission from the DVD player 21 to the TV set 20 is explained. In this case, the DVD player 21 serves as an audio and video source, and the TV set 20 serves as an audio and video sink. The isochronous data transmission for the audio and video data is specified in the special international standard IEC 61883 parts 1 to 4. According to this standard, a logical data link is set up between the audio/video source and the audio/video sink. According to the aforementioned standard, this is done using "plug registers". In this case, an isochronous data link is set up using an isochronous channel. For this channel, an "output plug register" is set on the transmission side, and an "input plug register" is set on the reception side. An application at the video source in the network then has the "plug register" in its IEEE 1394 address space. The application on the appliance operating as an audio/video sink needs to register itself in this address space so that it can be sent the audio/video data in the form of the isochronous data stream. Following a bus reset operation, the application software at the audio/video sink needs to renew the entry in this plug register within one second so that the video source does not terminate the stream. This is stipulated in this way in the IEC 61883-1 standard. Following a bus reset operation, the video source thus continues to deliver video data within a period of one second before it terminates the data stream. If the video sink registers itself as a video sink again in the period of one second, the previously existing isochronous data stream can continue to flow virtually without any significant interruption. If the plug register(s) is/are not renewed within the stipulated period of one second, the video data stream is interrupted and must later be set up completely afresh. To prevent the interruptions in the data stream, which are then clearly noticeable, it is therefore necessary for the plug register's entry to be renewed as quickly as possible after the bus reset operation. The application in the video sink cannot implement this entry until after the network node information table is present, however, since the plug register entry is written with GUID addressing in the case of HAVi, for example. Within the context of the problem on which the invention is based, however, the fact that another network node reacts slowly may mean that the network node information table is produced after a long delay, so that the application in the video sink is just not able to renew the entry for the plug register in time. When the inventive solution is applied, this problem is overcome in many cases and there are no noticeable interruptions in audio/video data streams which were set up beforehand.

The invention can be applied very appropriately in connection with IEEE 1394 home networks. It is not limited exclusively to this instance of application, however. It makes sense to use it whenever configuration data needs to be read from all network stations in a home network in order to create a network node information table which can be used to obtain address information for transactions in the network.

The invention claimed is:

1. A method for providing a table of station-specific information in a network of distributed stations, where the information for the table is requested from individual network stations by a requesting network station, the method comprising the steps of:

creating the table in two phases,
the first phase comprising receiving all that information up to a time determined by a first abort criterion and being sorted into the table, with the still incomplete table being enabled for use by an application program,
the second phase comprising requesting again the station-specific information which is still missing and sorting the still missing information into the table when it is delivered by the stations to which requests have been sent,
terminating the request for the rest of the station-specific information which is still missing after a time determined by a second abort criterion, and
closing the table with the available information and being provided for use.

2. The method as claimed in claim 1, wherein the application program is informed about each addendum to the table in the second phase.

3. The method as claimed in claim 1, wherein for those network stations whose station-specific information was not able to be obtained also in the second phase an entry is made in the table which indicates that the network station in question is not available in the network.

4. The method as claimed in claim 1, wherein a request for the station-specific information is provided with an upper time limit for the response, and the request is repeated if this upper limit is exceeded.

5. The method as claimed in claim 4, wherein the first and second abort criteria comprise a stipulation of an upper limit for the number of repetitions for the request for station-specific information.

6. The method as claimed in claim 5, wherein the network is a network based on one of the IEEE 1394 standard family, namely IEEE 139401995, IEEE 1394a and IEEE 1394b, wherein the upper time limit for the response to the request for the station-specific information is 100 ms, and the upper limit for the number of repetitions for the first abort criterion corresponds to a number between 3 and 6 and/or the upper limit for the number of repetitions for the second abort criterion corresponds to a number greater than 30.

7. A network station having a transmission unit and a reception unit for sending and receiving messages via a data transmission channel, the network station comprising:

table generating means creating a table of station specific information in two phases, and
requesting means requesting the information for the table from the individual network stations, the first phase comprising all information which has been received up to a time determined by a first abort criterion being transferred into the table, the table generation means enabling the still incomplete table for use, the second phase comprising the requesting means requesting the still missing station-specific information again and the table generation means transferring the station-specific information obtained into the table, the requesting means terminating the further requesting of the still missing station-specific information after a time determined by a second abort criterion, and the table generation means providing the table containing the available information for use.

8. The network station as claimed in claim 7, wherein the table generation means inform the application program in the second phase about each addendum to the table.

9. The network station as claimed in claim 7, wherein for those network stations whose station-specific information was not able to be obtained also in the second phase the table generation means make an entry in the table which indicates that the network station in question is not available in the network.

10. The network station as claimed in claim 8, wherein the requesting means provides a request for the station-specific information with an upper time limit for the response and repeat the request if this upper limit is exceeded.

11. The network station as claimed in claim 10, wherein the first and second abort criteria comprise a stipulation of an upper limit for the number of repetitions for the request for the station-specific information.

12. The network station as claimed in claim 11, wherein the network station is designed according to one of the IEEE 1394 standard family, namely IEEE 1394-1995, IEEE 1394a-2000 and IEEE 1394b-2002, and the upper time limit for the response to the request for the station-specific information is 100 ms and the upper limit for the number of repetitions for the first abort criterion corresponds to a number between 3 and 6 and/or the upper limit for the number of repetitions for the second abort criterion corresponds to a number greater than 30.

* * * * *